(12) United States Patent
Shim et al.

(10) Patent No.: US 10,637,340 B2
(45) Date of Patent: Apr. 28, 2020

(54) LINEAR VIBRATION GENERATING DEVICE

(71) Applicant: JAHWA electronics Co., Ltd., Chungcheongbuk-do (KR)

(72) Inventors: Soon Koo Shim, Chungcheongbuk-do (KR); Young Bin Chong, Chungcheongbuk-do (KR); Nam Jin Choi, Chungcheongbuk-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 259 days.

(21) Appl. No.: 15/903,679

(22) Filed: Feb. 23, 2018

(65) Prior Publication Data
US 2019/0103796 A1  Apr. 4, 2019

(30) Foreign Application Priority Data
Sep. 29, 2017 (KR) .......................... 10-2017-0128074

(51) Int. Cl.
*H02K 33/04* (2006.01)
*H02K 5/24* (2006.01)

(52) U.S. Cl.
CPC ............ *H02K 33/04* (2013.01); *H02K 5/24* (2013.01)

(58) Field of Classification Search
CPC ........ H02K 33/02; H02K 33/04; H02K 33/18; H02K 33/16
USPC .............................................. 310/25, 26, 30
See application file for complete search history.

(56) References Cited

U.S. PATENT DOCUMENTS

| 8,339,224 | B2* | 12/2012 | Kim | H02K 33/16 335/222 |
| 2005/0162105 | A1* | 7/2005 | Yamasaki | B06B 1/0246 318/114 |
| 2011/0198949 | A1* | 8/2011 | Furuich | H02K 33/16 310/25 |
| 2012/0319506 | A1* | 12/2012 | Shim | B06B 1/045 310/25 |

(Continued)

FOREIGN PATENT DOCUMENTS

| KR | 10-2011-0035754 A | 4/2011 |
| KR | 10-1180486 B1 | 9/2012 |

(Continued)

OTHER PUBLICATIONS

Korean Office Action dated Dec. 18, 2018, in connection with corresponding KR Application No. 10-2017-0128074 (10 pgs., including English translation).

*Primary Examiner* — Hanh N Nguyen
(74) *Attorney, Agent, or Firm* — Maier & Maier, PLLC

(57) ABSTRACT

A linear vibration generating device. The linear vibration generating device includes a vibrator including an annular magnet and a weight surrounding the magnet; a stator including a coil disposed at a center of the magnet and a yoke surrounding the coil; an elastic member disposed between the vibrator and the stator to elastically support the vibrator; and an anti-tilting unit coaxially coupled to a top of the yoke in a predetermined height. The anti-tilting unit is a non-magnetic body with a cylindrical shape having an outer diameter equal to or greater than a diameter of an outermost portion of the yoke and smaller than an inner diameter of the magnet.

9 Claims, 8 Drawing Sheets

(56) References Cited

U.S. PATENT DOCUMENTS

2016/0172950 A1* 6/2016 Shim .................. H02K 33/16
310/25
2018/0019651 A1* 1/2018 Kim .................. H02K 33/16

FOREIGN PATENT DOCUMENTS

KR 10-2014-0051503 A 5/2014
KR 10-1746007 B1 6/2017

* cited by examiner

CROSS SECTION ALONG LINE A-A

LINEAR VIBRATION GENERATING DEVICE

FIELD

The present disclosure relates to a linear vibration generating device, and more particularly, to a linear vibration generating device which is used in a mobile phone and generates vibrations due to weight fluctuations caused by the interaction of an electric field generated by a coil and a magnetic field generated by a magnet.

BACKGROUND

Generally, an eccentric rotation-type vibration generator has been widely used as a linear vibration generating device used as a receiver in a portable terminal. However, this technology does not guarantee a long life, gives a late response, and has limitations in implementing various vibration modes. Thus, this technology does not meet the demand of consumers in the current situation where touch-type smartphones are rapidly popularized.

As a countermeasure against to the above, a linear vibration generating device for generating vibration by linearly oscillating a weight has been developed. The developed linear vibration generating device uses interactions between an electric field generated by a coil and a magnetic field of a permanent magnet surrounding the coil to linearly oscillate the weight so that a desired vibration may be generated.

Korean Patent Registration No. 1180486 (hereinafter, referred to as 'Patent Literature') discloses a technique of generating vibration by linearly oscillating a weight in the title of "a linear vibration motor". The technology proposed in the patent literature has an advantage that the device may be designed in a small size while maintaining stable operation characteristics by increasing magnetic efficiency.

The linear vibrator disclosed in the patent literature will be described in more detail with reference to FIG. 1.

Referring to FIG. 1, the linear vibrator briefly includes a vibrator 115, a stator 110, and a case 135 for protecting them. The vibrator 115 includes a magnet 111 for forming a magnetic field and a weight 112 surrounding the magnet 111. The stator 110 includes a yoke 107 provided at the center of a bracket 102 and a coil 106 disposed around the yoke 107.

A PCB 105 electrically contacting the coil and transmitting an electric signal provided from the outside to the coil is disposed on a central upper surface of the bracket 102. An elastic member 120 is interposed between the bracket 102 and the weight 112 to elastically support the vibrator 115 and limit its amplitude so as to ensure smooth vibration.

This linear vibrator generates vibrations with up and down oscillations of the vibrator 115 due to the electromagnetic interaction between the stator 110 and the vibrator 115. However, during the vibration generating process, the vibrator 115 is accompanied with lateral shaking, namely tilting (see the broken lines) as well as normal up and down oscillations. There are many causes of this tilting, but the tilting is caused mainly due to the characteristics of the elastic member 120.

The tilting occurs more greatly when the vibrator 115 deviates from an overlap zone with the yoke 107 while the vibrator is in the upward stroke. In the zone where the vibrator 115 overlaps with the yoke 105, even though the tilting occurs, the inner circumference of the magnet 111 comes into contact with the outer surface of the yoke 107 to suppress serious tilting. However, beyond the zone, there is no restriction on the tilting of the vibrator 115.

A large amount of tilting that occurs beyond the zone where the vibrator 115 overlaps with the yoke 107 (the space above the yoke) causes physical contact between the case 135 and the vibrator 115 to generate noise. More specifically, an outer edge of the upper surface of the weight 112 opposite the elastic member 120 directly contacts an inner flat surface of the case 135, thereby generating noise and impact.

Tilting may not only cause noise and impact due to the contact with the case 135 but may also cause deformation of the elastic member 120, which leads to vibration frequency deformation. In other words, the tilting may cause deformation or breakage of the elastic member by concentrating the vibration force only on one side of the elastic member, which may adversely affect quality and reliability and thus result in deterioration of the durability of a product and shortening of the life span.

PATENT LITERATURE

Korean Patent Registration No. 10-1180486 (issued on Sep. 6, 2012)

SUMMARY

The present disclosure is directed to providing a linear vibration generating device, which may suppress tilting of a vibrator even beyond a zone where the vibrator overlaps with a yoke, thereby reliably reducing physical contact and resultant noise between components.

In one aspect of the present disclosure, there is provided a linear vibration generating device, comprising:

a vibrator including an annular magnet and a weight surrounding the magnet;

a stator including a coil disposed at a center of the magnet and a yoke surrounded by the coil;

an elastic member disposed between the vibrator and the stator to elastically support the vibrator; and an anti-tilting unit coaxially coupled to a top of the yoke in a predetermined height, wherein the anti-tilting unit is a non-magnetic body with a cylindrical shape having an outer diameter equal to or greater than a diameter of an outermost portion of the yoke and smaller than an inner diameter of the magnet.

In another aspect of the present disclosure, there is also provided a linear vibration generating device, comprising:

a vibrator including an annular magnet and a weight surrounding the magnet;

a stator including a coil disposed at a center of the magnet and a yoke surrounded by the coil;

an elastic member disposed between the vibrator and the stator to elastically support the vibrator; and an anti-tilting unit coaxially coupled to a top of the yoke in a predetermined height, wherein the anti-tilting unit is a non-magnetic body with a triangular or polygonal pillar shape so that an outermost surface thereof farthest from a center thereof is aligned at the same location as an outermost surface of the yoke or protrudes outwards in comparison to at least an outermost surface of the yoke so as to be spaced apart from an inner circumference of the magnet with a predetermined gap.

The stator applied in the embodiments of the present disclosure may further include a bracket configured to support the coil and the yoke surrounded by the coil; a case coupled to the bracket to form an inner space in which the vibrator is mounted; and a printed circuit board (PCB) disposed between the bracket and the coil to apply electricity to the coil.

In addition, the vibrator may further include a plate installed to cover one surface of the magnet between the magnet and the elastic member.

In addition, a damping member may be provided to at least one of an exposed surface of the magnet, opposite to the plate, or one surface of the stator facing the exposed surface.

Preferably, the damping member formed on the exposed surface of the magnet may be a magnetic fluid.

In addition, the anti-tilting unit applied in the embodiments of the present disclosure may be a non-magnetic metal or a non-conductive resin-based non-metal, may have an axially hollow structure, and be assembled to a protrusion formed at a center of an upper surface of the yoke to a predetermined height by means of interference fitting and fixed to the yoke.

Preferably, when the anti-tilting unit is a non-conductive resin-based non-metal, a lower end of the anti-tilting unit may be partially inserted into an upper center of the yoke and fixed to the yoke.

In addition, when the device is in operation, an upper surface of the anti-tilting unit may have the same height as an uppermost surface of the magnet at an uppermost point in a horizontal direction or be at least higher than the uppermost surface.

As another embodiment of the present disclosure, there is also provided a linear vibration generating device, further comprising an anti-tilting spring coupled to the bracket that supports the coil and the yoke surrounded by the coil, so that one end thereof is fixed to one surface of a case having an inner space in which the vibrator is mounted and the other end thereof is disposed to be in contact with the upper surface of the vibrator or to be spaced apart therefrom by a predetermined distance.

In the linear vibration generating device according to the embodiment of the present disclosure, an anti-tilting unit for preventing a vibrator from being tilted in a space above a yoke is applied, and thus, it is suppressed that the vibrator is tilted beyond a zone where the vibrator overlaps with the yoke, so that the physical contact and resultant noise between components may be reliably reduced.

In other words, since it is prevented that the vibrator is seriously tilted in the entire amplitude region, the physical impact due to the large tilting and resultant noise may be clearly reduced. As a result, it is possible to provide a highly reliable high-quality linear vibration generating device capable of exhibiting stable vibration performance for a long time together with high durability by significantly reducing the generation of impact and noise.

In addition, in the present disclosure, a magnetic fluid applied to a top surface of a magnet and acting as a damper partially moves to an inner circumference of the magnet by the attractive force with the yoke when the device is in operation, and serves as a frictional material when the vibrator is in ascending and descending strokes, and thus, when the vibrator is stopped according to a stop command, the falling time may be reduced among the response speed.

DETAILED DESCRIPTION OF THE DRAWINGS

Figure 1:
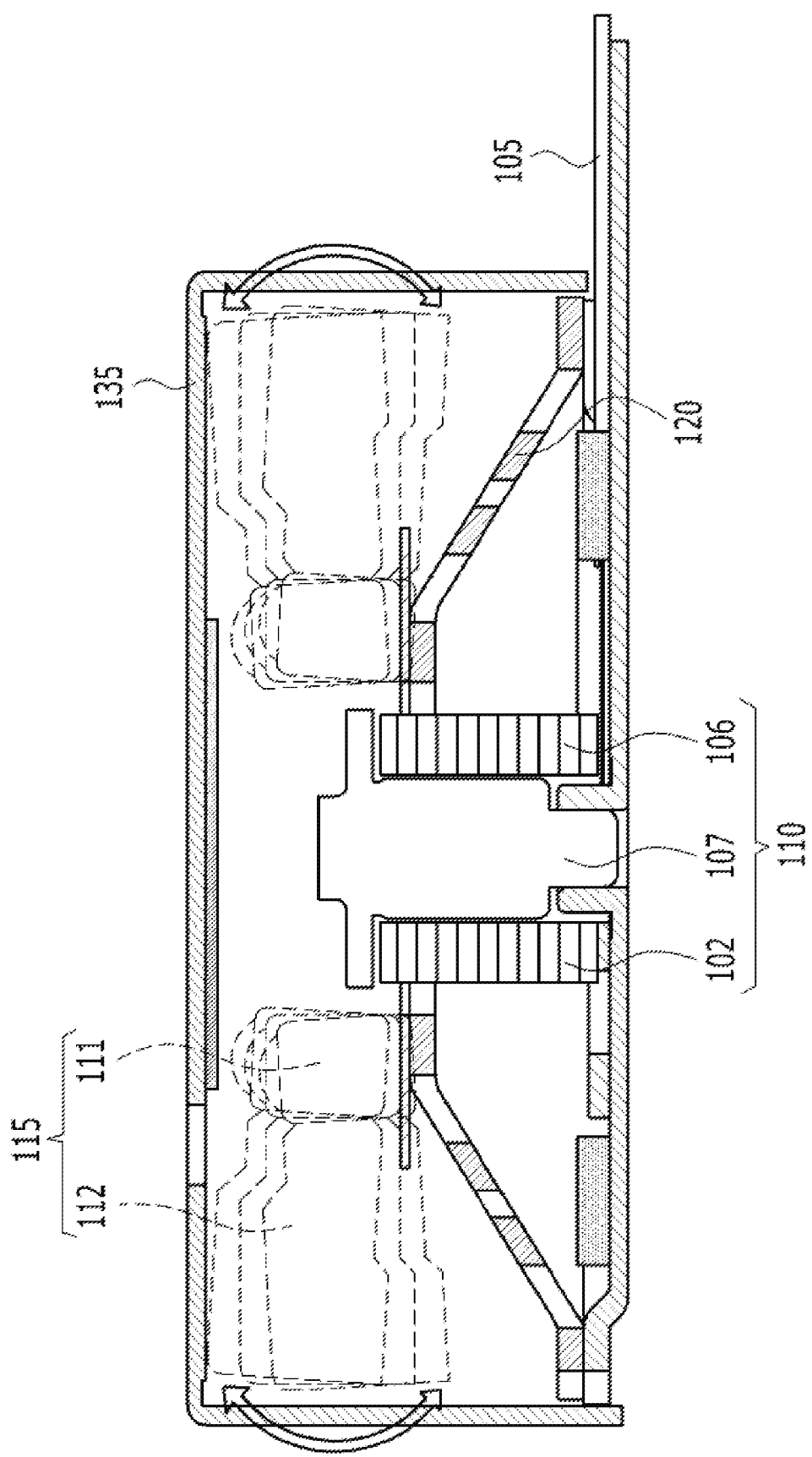
FIG. 1 is a cross-sectioned view showing a conventional linear vibration generating device.

Hereinafter, an embodiment of the present disclosure will be described in detail with reference to the accompanying drawings.

The terminology used herein is for the purpose of describing particular embodiments only and is not intended to be limiting of the present disclosure. As used herein, the singular forms are intended to include the plural forms as well, unless the context clearly indicates otherwise.

It will be further understood that the terms "comprises" and/or "comprising", or "includes" and/or "including" when used in this specification, specify the presence of stated features, integers, steps, operations, elements, components, or their combinations, but do not preclude the presence or addition of one or more other features, integers, steps, operations, elements, components, or their combinations.

The terms "first", "second", and the like can be used to explain various components, but the components should not be limited by the terms. These terms are used just to distinguish one element from another.

Further, the terms such as " . . . part", " . . . unit", " . . . module" or the like used herein means a unit processing at least one function or operation and can be implemented as hardware, software or a combination of hardware and software.

In the following description with reference to the accompanying drawings, the same reference numeral will be given to the same element, and a duplicate description thereof will be omitted. If the specific description of a related prior technique in the description of the present disclosure is deemed to unnecessarily obscure the present disclosure, its detailed description shall be omitted.

Figure 2:
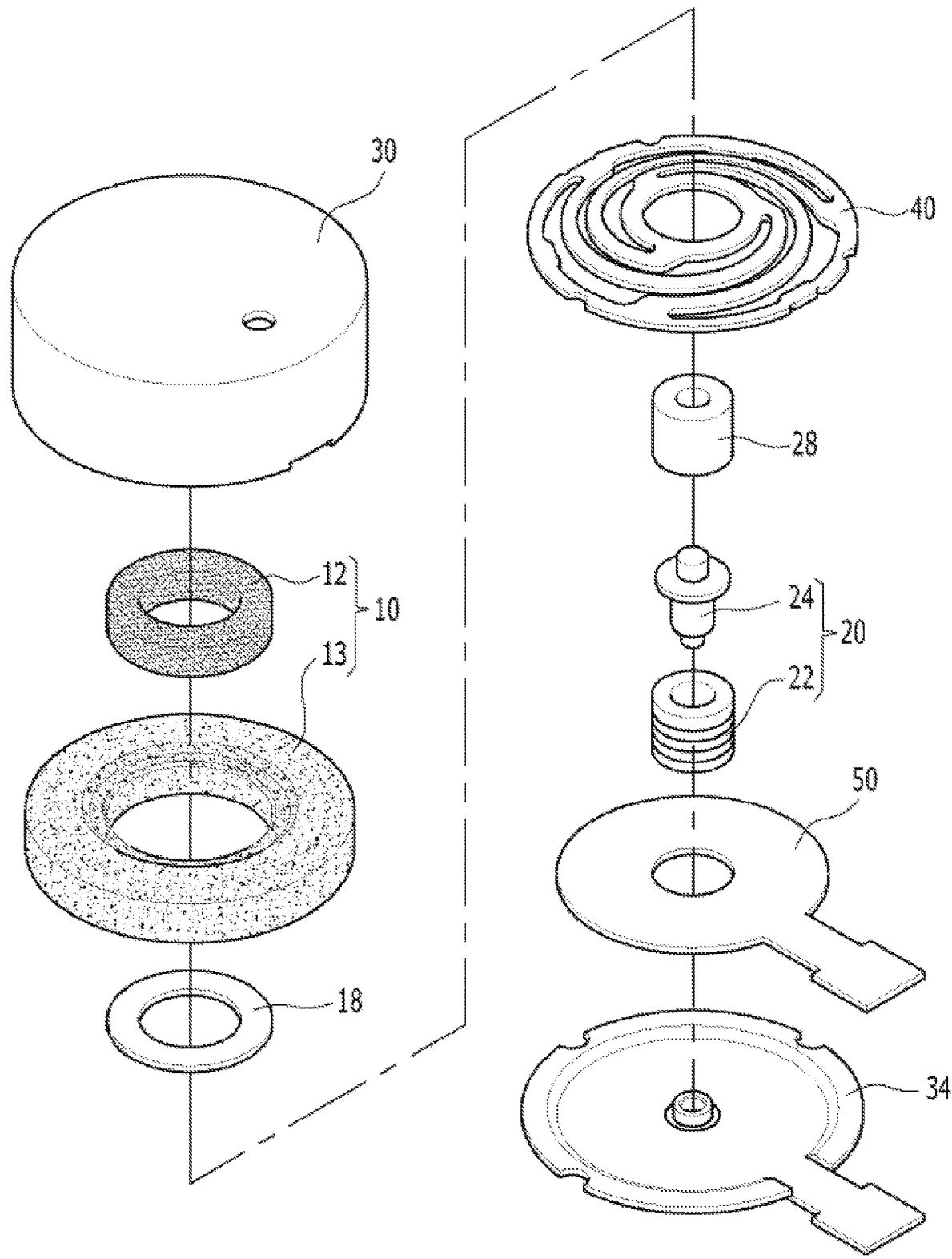
FIG. 2 is an exploded perspective view showing a linear vibration generating device according to an embodiment of the present disclosure.
Figure 3:
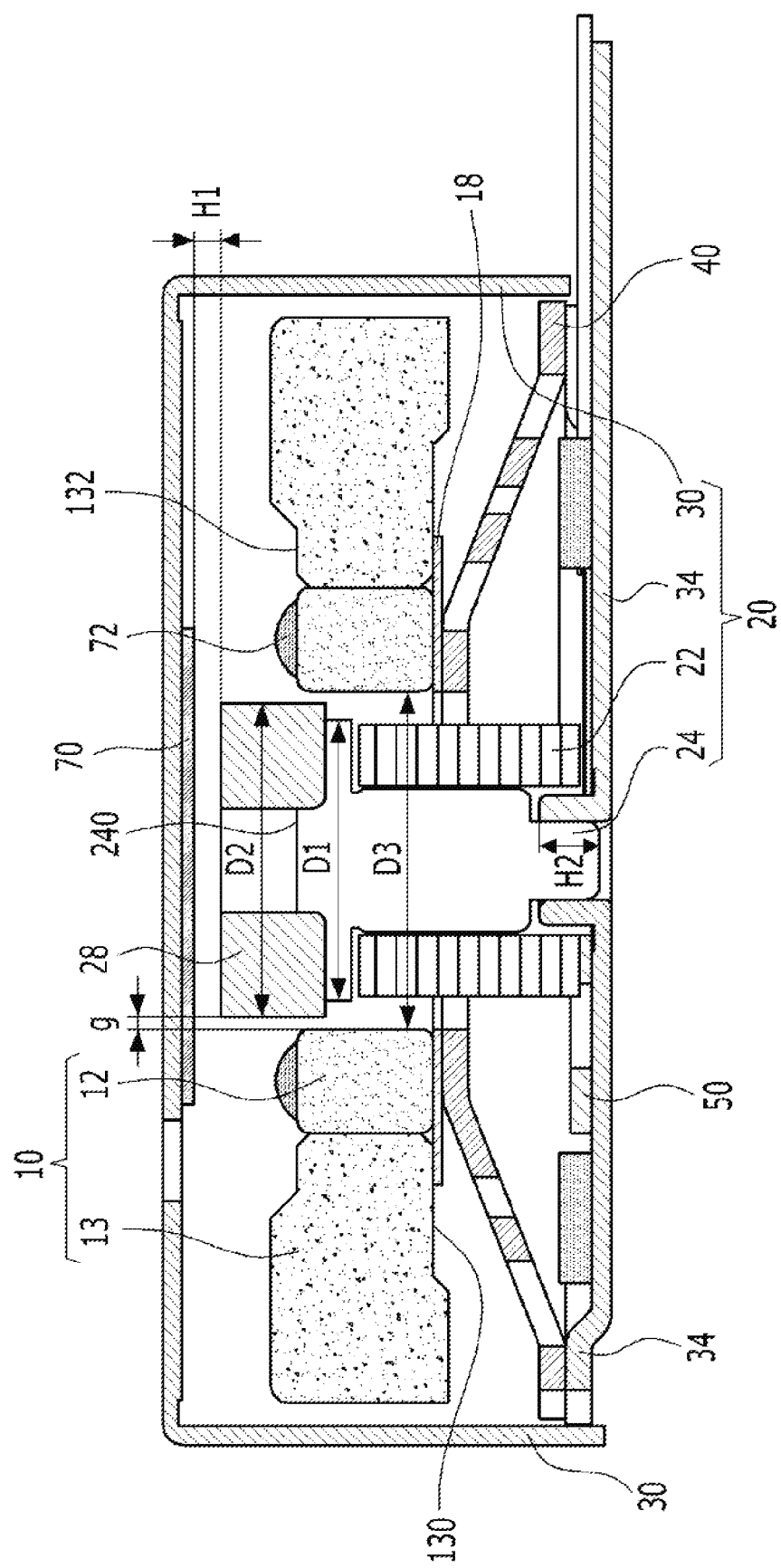
FIG. 3 is a cross-sectioned view showing the linear vibration generating device according to an embodiment of the present disclosure, in an assembled state.

FIG. 2 is an exploded perspective view showing a linear vibration generating device according to an embodiment of the present disclosure, and FIG. 3 is a cross-sectioned view showing the linear vibration generating device according to an embodiment of the present disclosure, in an assembled state.

Referring to FIGS. 2 and 3, a linear vibration generating device according to an embodiment of the present disclosure briefly includes a vibrator 10 and a stator 20. An elastic member 40 for elastically supporting the ascending and descending movement of the vibrator 10 is interposed between the vibrator 10 and the stator 20, and a PCB 50 for supplying electricity for generating vibration is disposed on a plate-shaped bracket 34 of the stator 20.

The vibrator 10 includes an annular magnet 12 for forming a magnetic field and a weight 13 coupled to surround the magnet 12 and giving a weight. In addition, the stator 20 includes a bracket 34, a cylindrical coil 22 placed on a top surface of the bracket 34 and disposed at a center of the magnet 12, a yoke 24 mounted to an inner circumference of the coil 22, and a case 30.

The coil 22 is electrically connected to the PCB 50 on the bracket 34 and receives an electric signal so that the vibrator 10 may vibrate with respect to the stator 20. By means of an attractive force and a repulsive force between an electric field generated by the coil 22 due to the received electricity and a magnetic field of the magnet 12, the vibrator 10 moves up and down with respect to the stator 20 to generate vibration.

The amplitude of the vibrator 10 may be limited to an appropriate range by the elastic modulus of the elastic member 40 and the attractive force between the magnet 12 and the yoke 24. Also, the magnet 12 may be an annular or donut-shaped magnet having an inner diameter that does not cause interference with the yoke 24 of the stator 20 and having opposite polarities in a vertical direction.

The yoke 24 may have a cylindrical shape with a section of a T shape or a + shape where a plate-shaped shielding portion covering the upper surface of the coil 22 is formed. In particular, the yoke 24 is made of a magnetic material to concentrate a magnetic flux generated from the magnet 12 toward the coil 22 wound on the outer circumference thereof and also to restrict the amplitude of the vibrator 10 to a predetermined range by generating an attractive force between the yoke 24 and the magnet 12.

The vibrator 10 includes a plate 18 covering one surface of the magnet 12. Preferably, the plate 18 is installed to cover the entire lower surface of the magnet and a portion of the lower surface of the weight 13 adjacent to the magnet 12. The plate 18 may have a plate shape with a hole formed at the center thereof and serves as a magnetic shield for concentrating the magnetic flux toward the coil 22.

Though it is depicted that the plate 18 is applied to only the lower surface of the magnet 12, the present invention is not limited thereto. In other words, the plate 18 may also be added to the upper surface of the vibrator 10 to cover the upper surface of the magnet 12 and a portion of the weight 13 adjacent thereto (not shown). Thus, it should be understood that this modification may also be included in the scope of the present disclosure.

In this case, the plate (not shown) installed on the upper surface of the vibrator 10 may also have a plate shape with a hole at the center, similar to the plate 18 installed on the lower surface of the vibrator 10, and serves as a magnetic shield for concentrating a magnetic flux toward the coil 22. Here, the plate added to the upper surface of the vibrator is not an essential component but an optional component.

The elastic member 40 is interposed between the plate 18 and the bracket 34 as described above. The elastic member 40 elastically supports the up and down vibrations of the vibrator 10 with respect to the stator 20 and functions to limit its amplitude. To this end, one end of the elastic member 40 may be fixed to the bracket 34 by welding or the like, and the other end of the elastic member 40 may be fixed to the lower surface of the plate 18 by welding or the like.

A lower concave portion 130 may also be formed at the lower surface of the weight 13 around the magnet 12 to have a height corresponding to the height of the plate 18. In this case, since the lower surface of the plate 18 and the lowermost surface of the weight 13 around the magnet 12 have the same height in a horizontal direction, it is possible to maximize a stroke distance in which the vibrator 10 may move in the vertical direction within the limited space.

The elastic member 40 provides an elastic force for restoring the position of the vibrator 10 with respect to the stator 20 by elastically supporting the vibrator 10 including the magnet 12 and the weight 13, which vibrates in the vertical direction, and simultaneously restricts the amplitude of the vibrator 10 to a predetermined distance to prevent the vibrator 10 including the magnet 12 and the weight 13 from colliding with case 30.

The case 30 of the stator 20 is coupled to the bracket 34 to form an inner space in which the vibrator 10 and the elastic member 40 may be mounted. At this time, the material of the case 30 is not particularly limited, but if only one plate is used or both plates are omitted, it is preferable that the case 30 is made of a magnetic material so as to function as a magnetic flux shielding unit.

An electric signal for operating the device is supplied from the outside to the coil 22 via the PCB 50. As shown in FIG. 2, the PCB 50 may have an annular ring shape, and the coil 22 and the yoke 24 mounted to the inner circumference of the coil 22 may be directly connected to the bracket 34 or coupled to a coupling hole (no reference sign) at the center of the bracket 34 through the hole at the center of the PCB 50.

Damping members 70, 72 may be provided on an exposed surface of the magnet 12 opposite to the plate 18, namely an upper surface of the magnet 12, and one surface of the stator 20 facing the upper surface, namely one surface of the case 30, respectively. The damping members 70, 72 serve to prevent direct physical contact and resultant noise between the vibrator 10 and the case 30 when the device is in operation, namely in an ascending stroke.

The damping member 70 applied to the case 30 may be an elastic pad made of a material capable of absorbing/mitigating impact, for example rubber, silicon or porous rubber. Also, the damping member 72 provided on the upper surface of the magnet 12 may be a magnetic fluid in which magnetic powder is dispersed in a liquid in a colloid shape.

An upper concave surface 132 may also be formed on the upper surface of the weight 13 around the magnet 12 with a height corresponding to the height of the magnetic fluid. In this case, since the bottom surface of the magnetic fluid and the height of the uppermost surface of the weight 13 around the magnet 12 have approximately the same height, the loss of the stroke distance of the vibrator 10 caused by a magnetic fluid protruding above the magnet 12 may be minimized within a restricted space.

In other words, when the upper concave surface 132 is formed at the weight 13, since the amplitude loss of the vibrator corresponding to the height of the upper concave surface 132 may be offset by means of the upper concave surface 132 by applying the magnetic fluid, it is not needed to increase the height of the case 30 in order to obtain amplification for sufficient vibration performance. The upper concave surface 132 and the lower concave portion 130 may be formed through appropriate machining such as cutting.

An anti-tilting unit 28 is coaxially coupled to the top end of the yoke 24 of the stator 20 at a predetermined. The anti-tilting unit 28 suppresses lateral oscillation, namely tilting, of the vibrator 10 beyond a zone in which the anti-tilting unit 28 overlaps with the yoke 24. That is, during an ascending or descending stroke, the anti-tilting unit 28 prevents the vibrator 10 from being seriously tilted in the lateral direction in the space above the yoke 24.

The anti-tilting unit 28 may be a cylindrical non-magnetic body having an outer diameter or width D2 equal to or greater than at least a diameter D1 of an outermost portion of the yoke 24 and smaller than an inner diameter D3 of the magnet. Preferably, the anti-tilting unit 28 may be made of a non-magnetic material such as brass or a non-conductive resin-based non-metal such as a plastic. If the anti-tilting unit 28 is formed in a pillar shape having an axially hollow structure with a section of an annular shape, it would be advantageous in reducing the weight of the device and improving the economic efficiency.

The main function of the anti-tilting unit 28 is to suppress the tilting of the vibrator 10 in the space above the yoke 24. However, on the other hand, the anti-tilting unit 28 also functions to prevent the yoke 24 from being completely released from the bracket 34 when a physical impact is applied from the outside. That is, the anti-tilting unit 28 also serves as a stopper for preventing the yoke 24 from deviating due to an external physical impact.

The function as a stopper may be exerted by forming the upper surface of the anti-tilting unit 28 at a height enough to slightly touch the damping members 70, 72 at the inside of the case 30 facing the upper surface. Without being limited thereto, the function as a stopper may be exerted as long as a H1 between the anti-tilting unit 28 and the damping member 70 is smaller than a binding height H2 between the bracket 34 and the yoke 24.

Considering the main function of suppressing the tilting, most preferably, the height of the upper surface of the anti-tilting unit 28 is equal to the height of the uppermost surface of the magnet 12 at an uppermost point when the device is in operation or at least higher than the uppermost surface, including the case where the top end surface of the anti-tilting unit 28 is slightly touched to the damping members 70, 72 at the inside of the case 30 facing the top end surface.

The anti-tilting unit 28 may have an axially hollow structure as shown in the drawing and may also be fixed to the yoke 24 by being assembled with a protrusion 240 formed on a center of the top surface of the yoke 24 by a predetermined height. However, if the anti-tilting unit 28 is made of a non-conductive resin-based non-metal, the yoke 24 and the anti-tilting unit 28 may be configured to form one body by means of insert molding.

Figure 4:
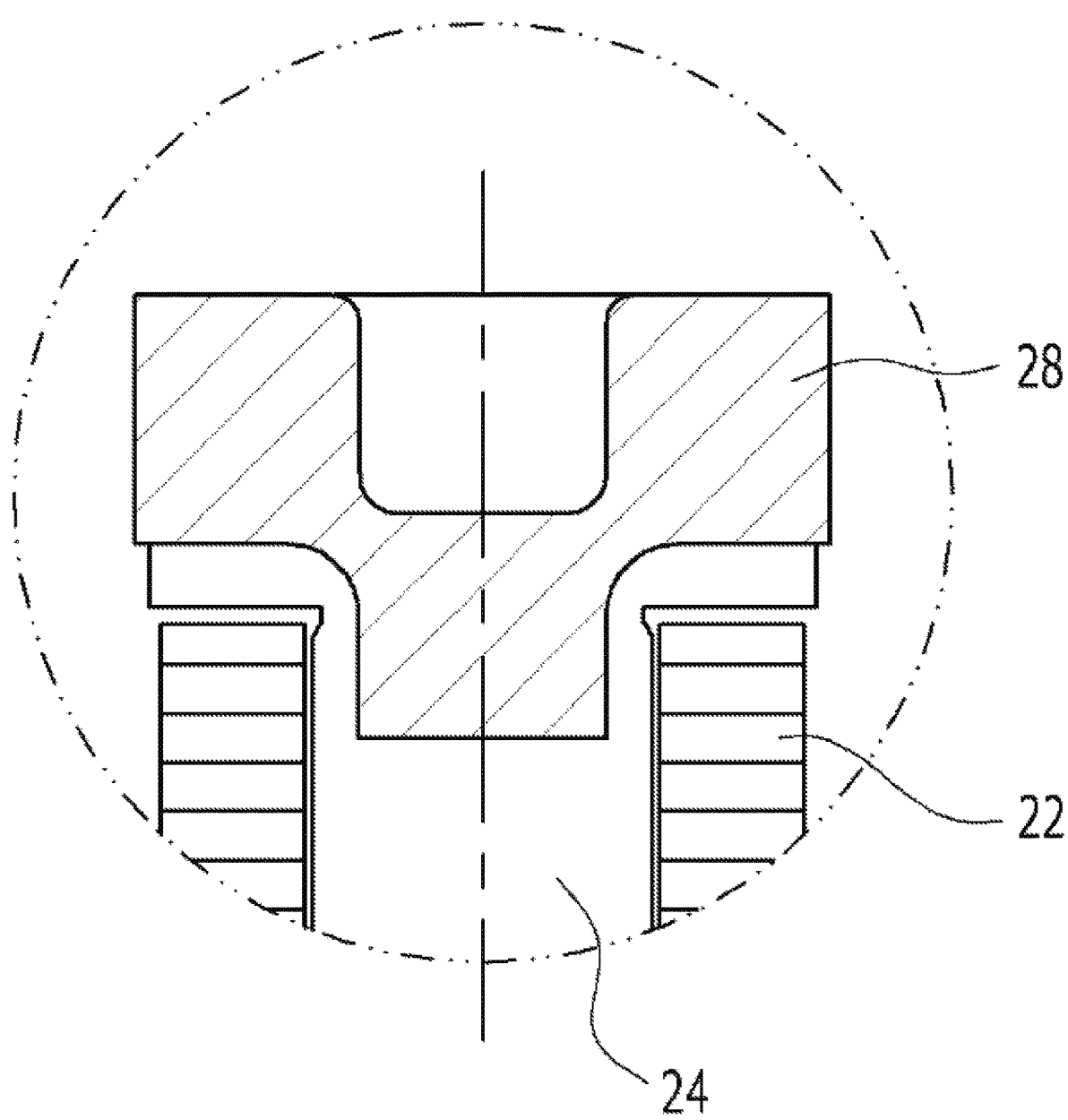
FIG. 4 is a diagram showing a modified example of the anti-tilting unit depicted in FIG. 3.

In other words, as in the modified example of FIG. 4, if the anti-tilting unit 28 is a resin-based injection-molded material, insert molding may be performed so that a lower end of the anti-tilting unit 28 is partially inserted into the upper center of the yoke 24 to ensure firm coupling between the anti-tilting unit 28 and the yoke 24. In addition to this method, any coupling method known in the art may be used as long as the anti-tilting unit 28 and the yoke 24 are coaxial coupled, for example screw fastening.

Figure 5:
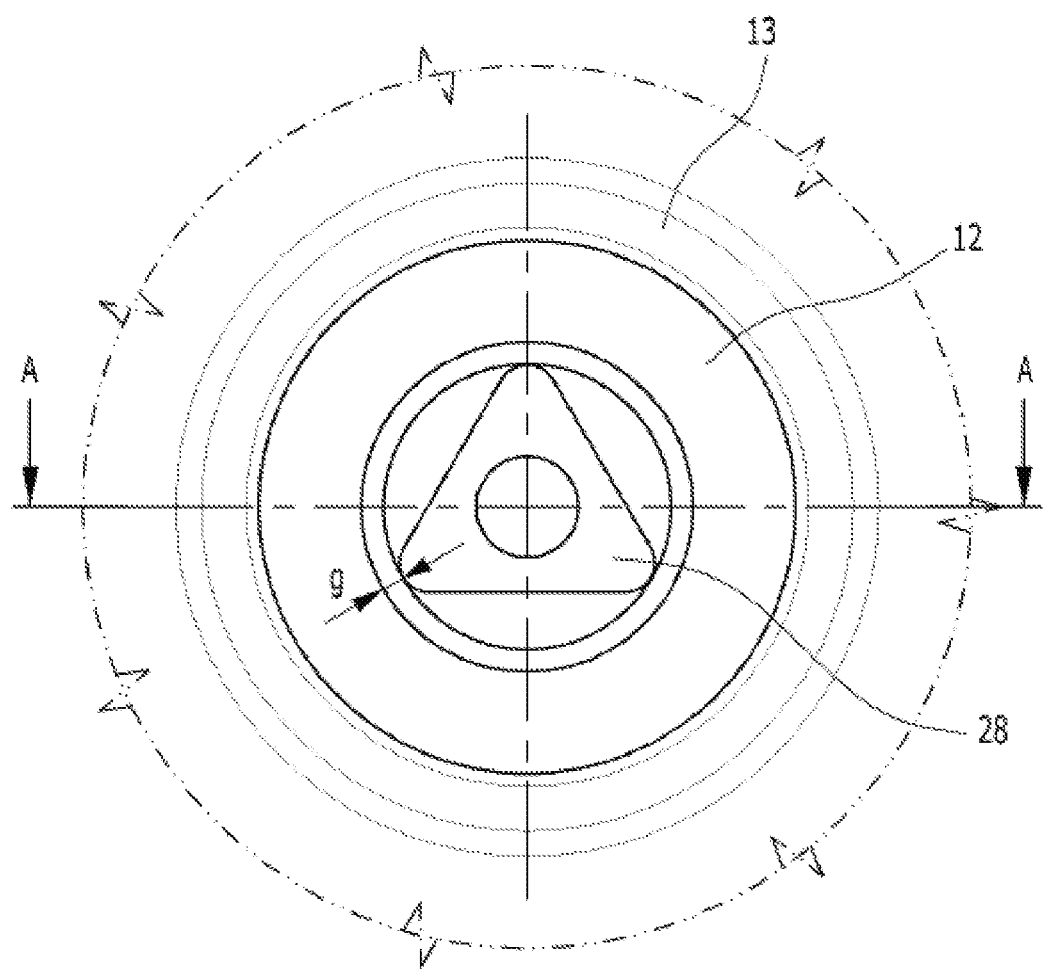
FIG. 5 is an enlarged view showing a main part of a linear vibration generating device according to another embodiment of the present disclosure.
Figure 5:
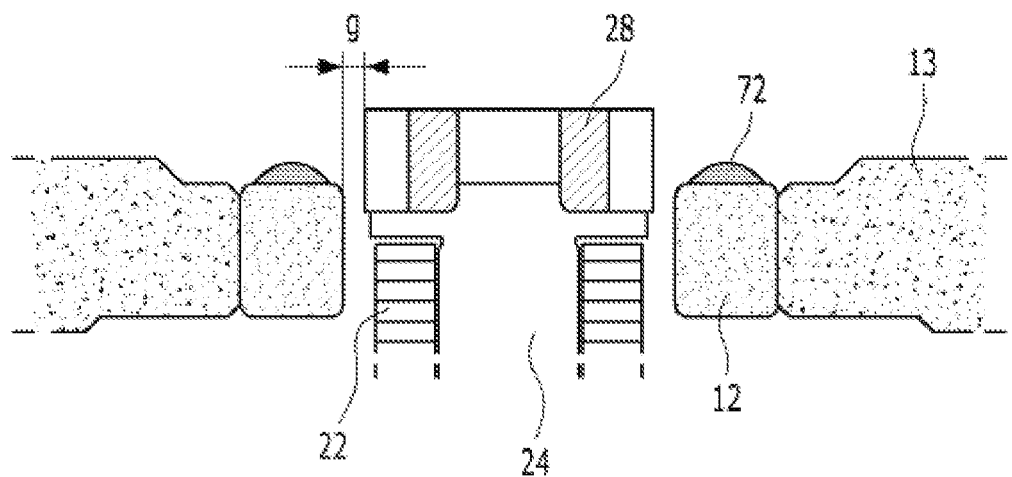

FIG. 5 is an enlarged view showing a main part of a linear vibration generating device according to another embodiment of the present disclosure.

Referring to FIG. 5, the outermost surface of the anti-tilting unit 28, which is the farthest from the center thereof, is arranged at least at the same position as the outermost surface of yoke 24 or protrudes outwards at least in comparison to the outermost surface of yoke 24 to be spaced apart from the inner circumference of the magnet by a predetermined gap. Here, the anti-tilting unit 28 may have an axially hollow polygonal pillar structure whose section has a triangular or polygonal shape.

In another embodiment depicted in FIG. 5, the total volume of the anti-tilting unit 28 may smaller than the former embodiment having a circular section while the tilting suppressing effect, which is the main function of the anti-tilting unit 28, is identically exhibited. Accordingly, it is possible to lower the production cost by reducing the material cost and further reduce the weight of the device. Thus, the above structure is advantageous for a lighter design of the device.

Hereinafter, the operation and effects of the linear vibration generating device according to the present disclosure will be described.

Figure 6:
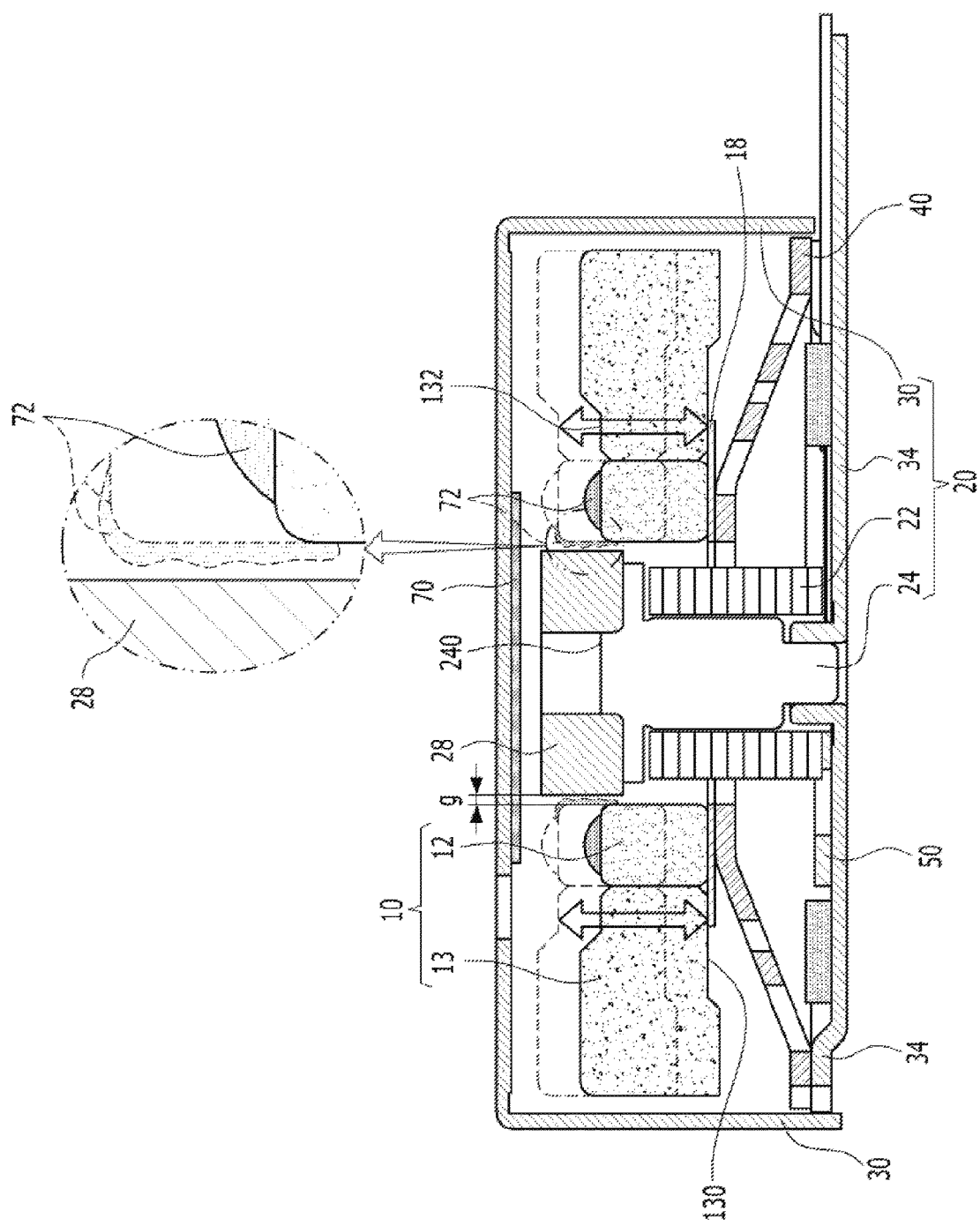
FIG. 6 is a diagram showing an operation state of the linear vibration generating device according to the present disclosure.

FIG. 6 is a diagram showing an operation state of the linear vibration generating device according to the present disclosure.

Referring to FIG. 6, an electric signal having a predetermined frequency and inputted through a power terminal (no reference sign) of the PCB 50 is transmitted to the coil 22 through a patterned circuit formed on the PCB 50, thereby forming an electric field. The formed electric field of the coil causes interactions with a magnetic field generated by the magnet 22 around the coil 22, which is concentrated toward the coil due to the yoke 24, to generate attraction and repulsion alternately.

The vibrator 10 including the magnet 12 and the weight 13 oscillates up and down in the case 30 with respect to the stator 20 as shown in the figure due to alternately generated attractive and repulsive forces to generate vibrations, and the elastic member 40 serves as a medium to transmit the vibrations by the vibrator 10 to the outside. Here, the elastic member 40 also functions to limit the amplitude of the vibrator 10 and restore the vibrator 10 to its original position.

Meanwhile, the magnetic fluid 72 applied to the top surface of the magnet 12 of the vibrator 10 partially flows toward the inner circumference of the magnet 12 by the attraction with the yoke 24 when the device is in operation. At this time, the magnetic fluid 72 moved to the inner circumference of the magnet 12 functions as a damper to prevent a direct physical collision between the magnet 12 and the anti-tilting unit 28 when the vibrator 10 is tilted.

Even though serious tilting is suppressed throughout the entire stroke distance by the yoke 24 and the anti-tilting unit 28 installed thereon, even slight tilting is generated due to a gap g between the anti-tilting unit 28 and the magnet 12, the tilting impact may be absorbed/mitigated because the part of the magnetic fluid 72 moved to the inner circumference of the magnet 12 prevents contact between the anti-tilting unit 28 and the magnet 12 therebetween.

Meanwhile, the part of the magnetic fluid moved to the inner circumference of the magnet 12 due to the attraction with the yoke 24 when the device is in operation also functions as a frictional material when the vibrator 10 ascends or descends between the anti-tilting unit 28 and the magnet. Accordingly, when the vibrator 10 stops according to a device stop command, a falling time may be greatly shortened among the response speed.

Meanwhile, though not specifically illustrated in the drawing, there may be a modification in which the diameter of the outermost portion of the yoke is smaller than the diameter of the outermost portion of the coil. In another embodiment, the outer diameter or width of the anti-tilting unit 28 can be equal to or larger than the diameter of the outermost portion of the coil. In this case, the same operation and effects as described above also may be obtained. Thus, it should be understood that this modification may also be included in the scope of the present disclosure.

Figure 7:
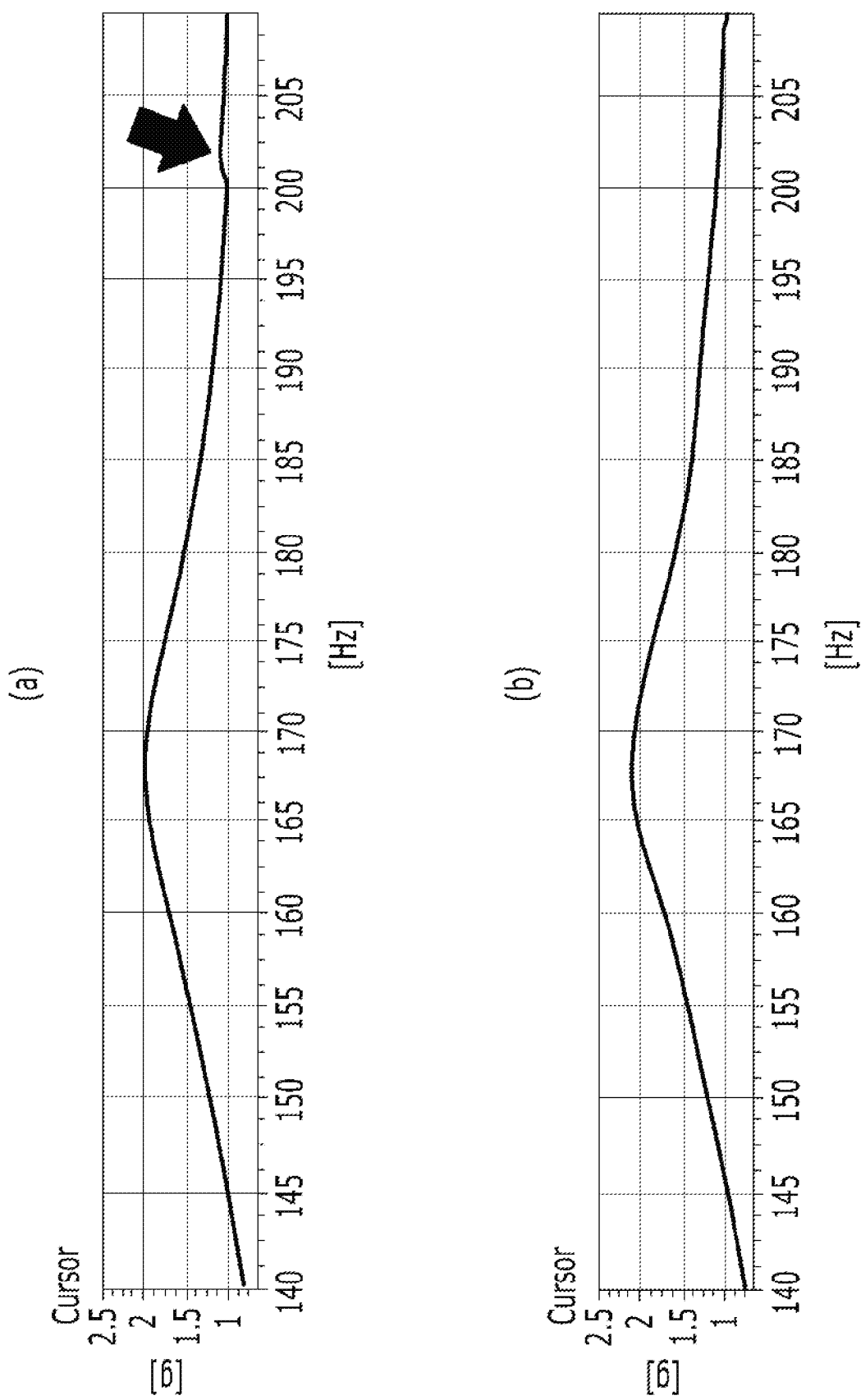
FIG. 7 shows test data representing a magnitude of vibration that changes according to an input frequency when the linear vibration generating device is in operation.

FIG. 7 shows test data representing a magnitude of vibration that changes according to an input frequency when the linear vibration generating device is in operation. Here, (a) of FIG. 7 shows vibration test data of a conventional linear vibration generating device to which an anti-tilting unit is not applied, and (b) of FIG. 7 shows vibration test data of the linear vibration generating device according to the present disclosure to which the anti-tilting unit is applied.

Seeing FIG. 7, it would be found that as the input frequency increases, the magnitude of vibration increases linearly and then decreases steadily from a specific frequency region. At this time, the point at which the magnitude of vibration is maximum at a specific frequency region is a resonance point (an inflection point in the graph), and the magnitude of vibration is gradually decreased from the resonance point.

However, seeing (a) of FIG. 7, it would be found that the magnitude of vibration temporarily increases at another specific frequency region (200 to 202 Hz) after the resonance point. This means that an unstable vibration such as tilting occurs in the vibrator in the corresponding frequency region. However, seeing (b) of FIG. 7 where the anti-tilting unit is applied, it would be found that no unstable vibration occurs in the same region (200 to 202 Hz).

In other words, it would be clearly understood from the test data that the vibration performance of the device is stable when the anti-tilting unit is applied as in the present disclosure, compared to the conventional linear vibration generating device to which an anti-tilting unit is not applied. This can also be interpreted that the anti-tilting unit clearly gives an effect on suppressing the tilting of the vibrator when the device is in operation.

Figure 8:
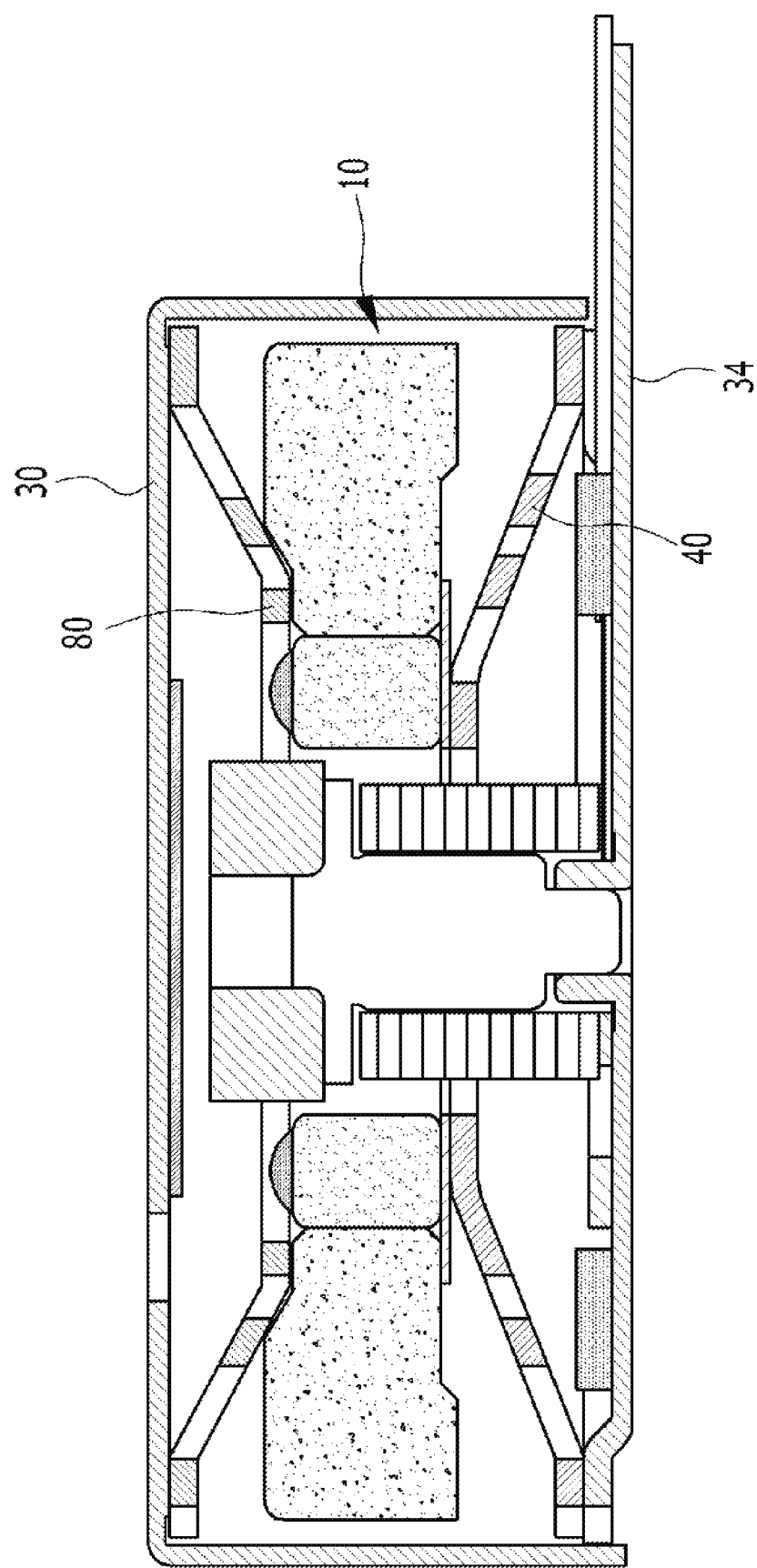
FIG. 8 is a cross-sectioned view showing a linear vibration generating device according to another embodiment of the present disclosure.

FIG. 8 is a cross-sectioned view showing a linear vibration generating device according to another embodiment of the present disclosure.

Referring to FIG. 8, the basic configuration and structure of a linear vibration generating device according to another embodiment of the present disclosure are the same as those of the linear vibration generating device of the former embodiments. However, in this embodiment, one anti-tilting spring 80 is further added between the vibrator 10 and the case 30 that is at a side opposite to the elastic member so that tilting may be suppressed more reliably.

In detail, the anti-tilting spring 80 of this embodiment is coupled with the bracket 34 and adhered and fixed to one side of the case 30 which forms an inner space where the vibrator 10 is mounted by means of welding or special adhesive. Also, the other end of the anti-tilting spring 80 at an opposite side may slightly touch the upper surface of the vibrator 10 facing one surface of the case 30 or be spaced therefrom by a predetermined distance.

In this embodiment of the present disclosure configured as above, the upper portion of the vibrator is also elastically supported by the anti-tilting spring 80. Thus, when the vibrator 10 vibrates at high speed, the anti-tilting spring 80 suppresses the rotation or tilting of the vibrator 10, caused by the characteristic of the elastic member 40 therebelow at a specific frequency band, thereby reducing noise due to rotation or tilting of the vibrator more reliably.

Meanwhile, though not specifically shown in the figure, there may be a modification in which the anti-tilting spring 80 is disposed below the vibrator 10 to slightly touch the lower surface of the vibrator 10 or be spaced apart therefrom, and the elastic member 40 is disposed between the vibrator 10 and the case 30 above the vibrator 10 so that one end and the other end of the elastic member 40 are respectively fixed to the case and the upper surface of the vibrator 10. Thus, it should be understood that this modification may also be included in the scope of the present disclosure.

In the linear vibration generating device according to the embodiment of the present disclosure, the anti-tilting unit for preventing the vibrator from being seriously tilted in the space above the yoke is applied, and thus, it is suppressed that the vibrator is tilted beyond a zone where the vibrator overlaps with the yoke, so that the physical contact and resultant noise between components may be reliably reduced.

In other words, since it is prevented that the vibrator is seriously tilted in the entire amplitude region, the physical impact due to the large tilting and resultant noise may be clearly reduced. As a result, it is possible to provide a highly reliable high-quality linear vibration generating device capable of exhibiting stable vibration performance for a long time together with high durability by significantly reducing the generation of impact and noise.

In addition, in the present disclosure, the magnetic fluid applied to the top surface of the magnet and acting as a damper partially moves to the inner circumference of the magnet by the attraction force with the yoke when the device is in operation, and serves as a frictional material when the vibrator is in ascending and descending strokes, and thus, when the vibrator is stopped according to a stop command, the falling time may be reduced among the response speed.

The present disclosure has been described only for specific embodiments thereof. However, it should be understood that the present disclosure is not limited to the specific embodiments disclosed herein but rather encompass all modifications, equivalents, and alternatives falling within the scope of the present disclosure as defined by the appended claims.

What is claimed is:

1. A linear vibration generating device, comprising:
   a vibrator including an annular magnet and a weight surrounding the magnet;
   a stator including a coil disposed at a center of the magnet and a yoke surrounded by the coil;
   an elastic member disposed between the vibrator and the stator to elastically support the vibrator; and
   an anti-tilting unit coaxially coupled to a top of the yoke in a predetermined height, wherein the anti-tilting unit is a non-magnetic body with a cylindrical shape having an outer diameter equal to or greater than a diameter of an outermost portion of the yoke and smaller than an inner diameter of the magnet,
   wherein the anti-tilting unit is a non-magnetic metal or a non-conductive resin-based non-metal, and
   wherein the anti-tilting unit has an axially hollow structure and is assembled to a protrusion formed at a center of an upper surface of the yoke to a predetermined height by means of interference fitting and fixed to the yoke.

2. The linear vibration generating device according to claim 1,
   wherein the stator further includes:
   a bracket configured to support the coil and the yoke surrounded by the coil;
   a case coupled to the bracket to form an inner space in which the vibrator is mounted; and
   a printed circuit board (PCB) disposed between the bracket and the coil to apply electricity to the coil.

3. The linear vibration generating device according to claim 1,
   wherein the vibrator includes a plate installed to cover one surface of the magnet between the magnet and the elastic member.

4. The linear vibration generating device according to claim 3, wherein a damping member is provided to at least one of an exposed surface of the magnet, opposite to the plate, or one surface of the stator facing the exposed surface.

5. The linear vibration generating device according to claim 4,
wherein the damping member formed on the exposed surface of the magnet is a magnetic fluid.

6. The linear vibration generating device according to claim 1,
wherein when the anti-tilting unit is a non-conductive resin-based non-metal, a lower end of the anti-tilting unit is partially inserted into an upper center of the yoke and fixed to the yoke.

7. The linear vibration generating device according to claim 1,
wherein when the device is in operation, an upper surface of the anti-tilting unit has the same height as an uppermost surface of the magnet at an uppermost point in a horizontal direction or is at least higher than the uppermost surface.

8. A linear vibration generating device, comprising:
a vibrator including an annular magnet and a weight surrounding the magnet;
a stator including a coil disposed at a center of the magnet and a yoke surrounded by the coil;
an elastic member disposed between the vibrator and the stator to elastically support the vibrator; and
an anti-tilting unit coaxially coupled to a top of the yoke in a predetermined height,
wherein the anti-tilting unit is a non-magnetic body with a triangular or polygonal pillar shape so that an outermost surface thereof farthest from a center thereof is aligned at the same location as an outermost surface of the yoke or protrudes outwards in comparison to at least an outermost surface of the yoke so as to be spaced apart from an inner circumference of the magnet with a predetermined gap (g),
wherein the anti-tilting unit is a non-magnetic metal or a non-conductive resin-based non-metal, and
wherein the anti-tilting unit has an axially hollow structure and is assembled to a protrusion formed at a center of an upper surface of the yoke to a predetermined height by means of interference fitting and fixed to the yoke.

9. A linear vibration generating device, comprising:
a vibrator including an annular magnet and a weight surrounding the magnet;
a stator including a coil disposed at a center of the magnet and a yoke surrounded by the coil;
an elastic member disposed between the vibrator and the stator to elastically support the vibrator;
an anti-tilting unit coaxially coupled to a top of the yoke in a predetermined height,
wherein the anti-tilting unit is a non-magnetic body with a cylindrical shape having an outer diameter equal to or greater than a diameter of an outermost portion of the yoke and smaller than an inner diameter of the magnet; and
an anti-tilting spring coupled to a bracket that supports the coil and the yoke surrounded by the coil, so that one end thereof is fixed to one surface of a case having an inner space in which the vibrator is mounted and the other end thereof is disposed to be in contact with the upper surface of the vibrator or to be spaced apart therefrom by a predetermined distance.

* * * * *